Feb. 8, 1938.　　　　　K. GÖBEL　　　　　2,107,607
MACHINE FOR TREATING RESILIENT MATERIAL
Filed April 26, 1933　　　5 Sheets-Sheet 1
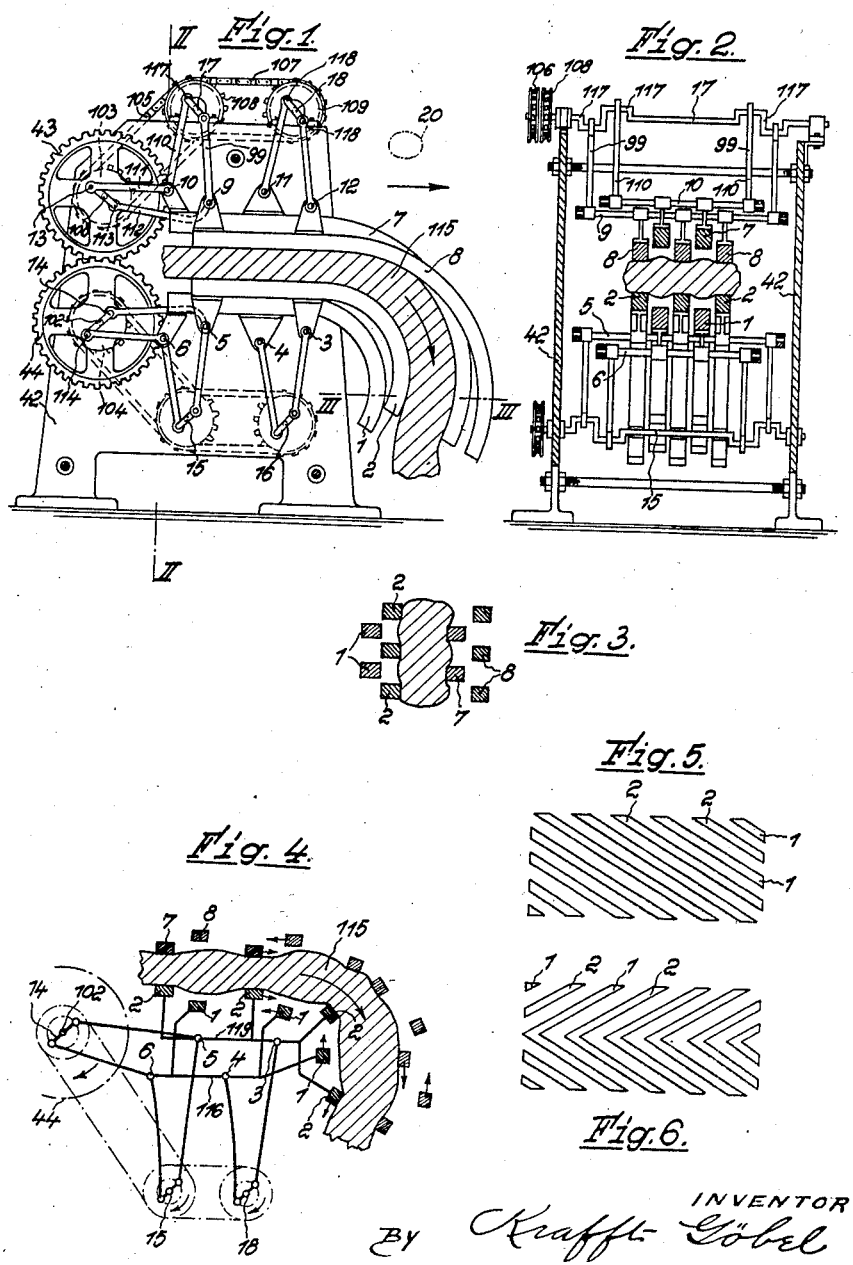

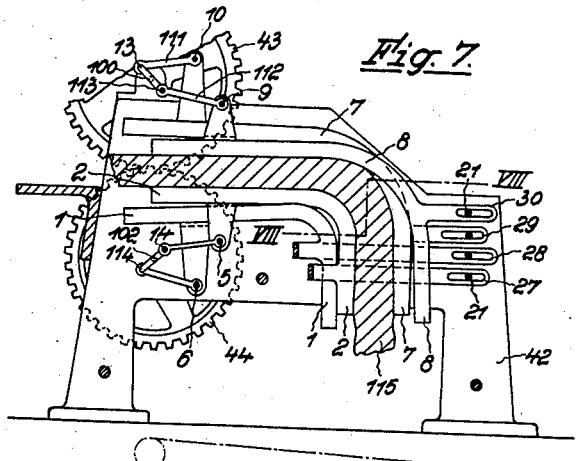
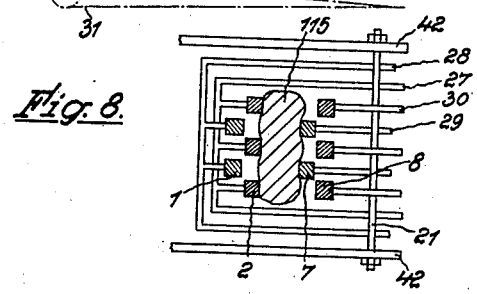
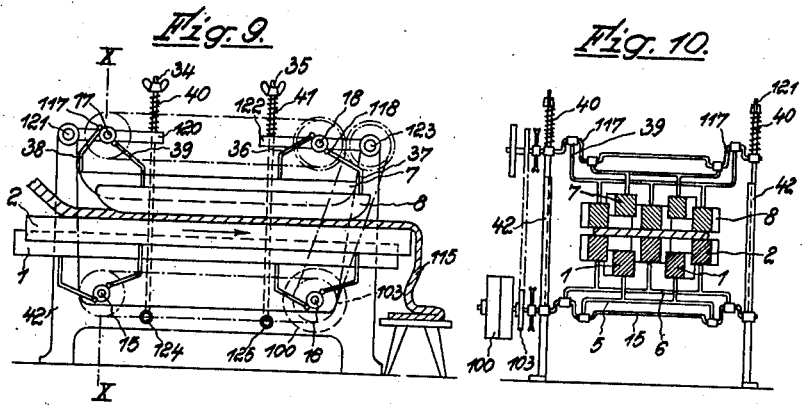
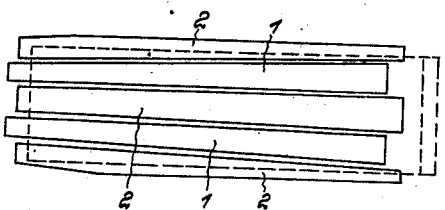

Feb. 8, 1938.  K. GÖBEL  2,107,607
MACHINE FOR TREATING RESILIENT MATERIAL
Filed April 26, 1933   5 Sheets-Sheet 3
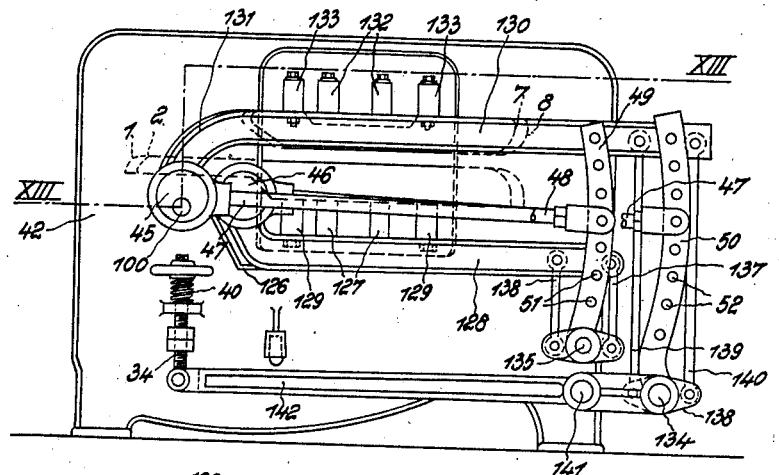
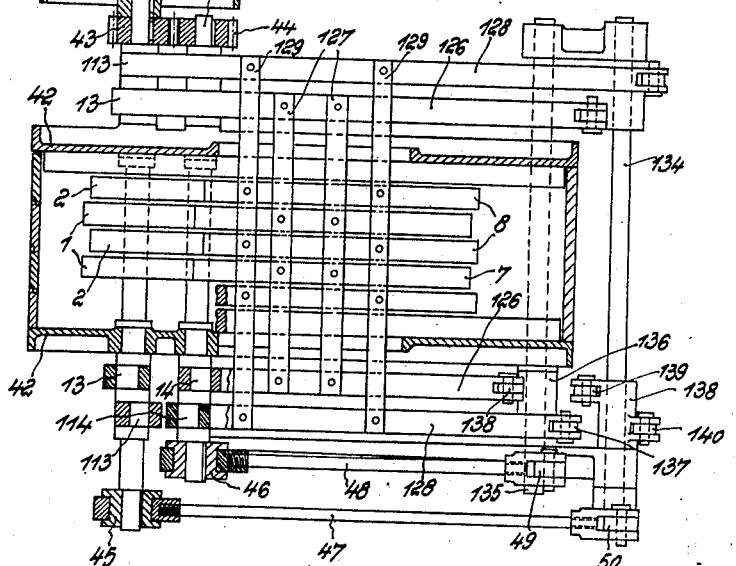

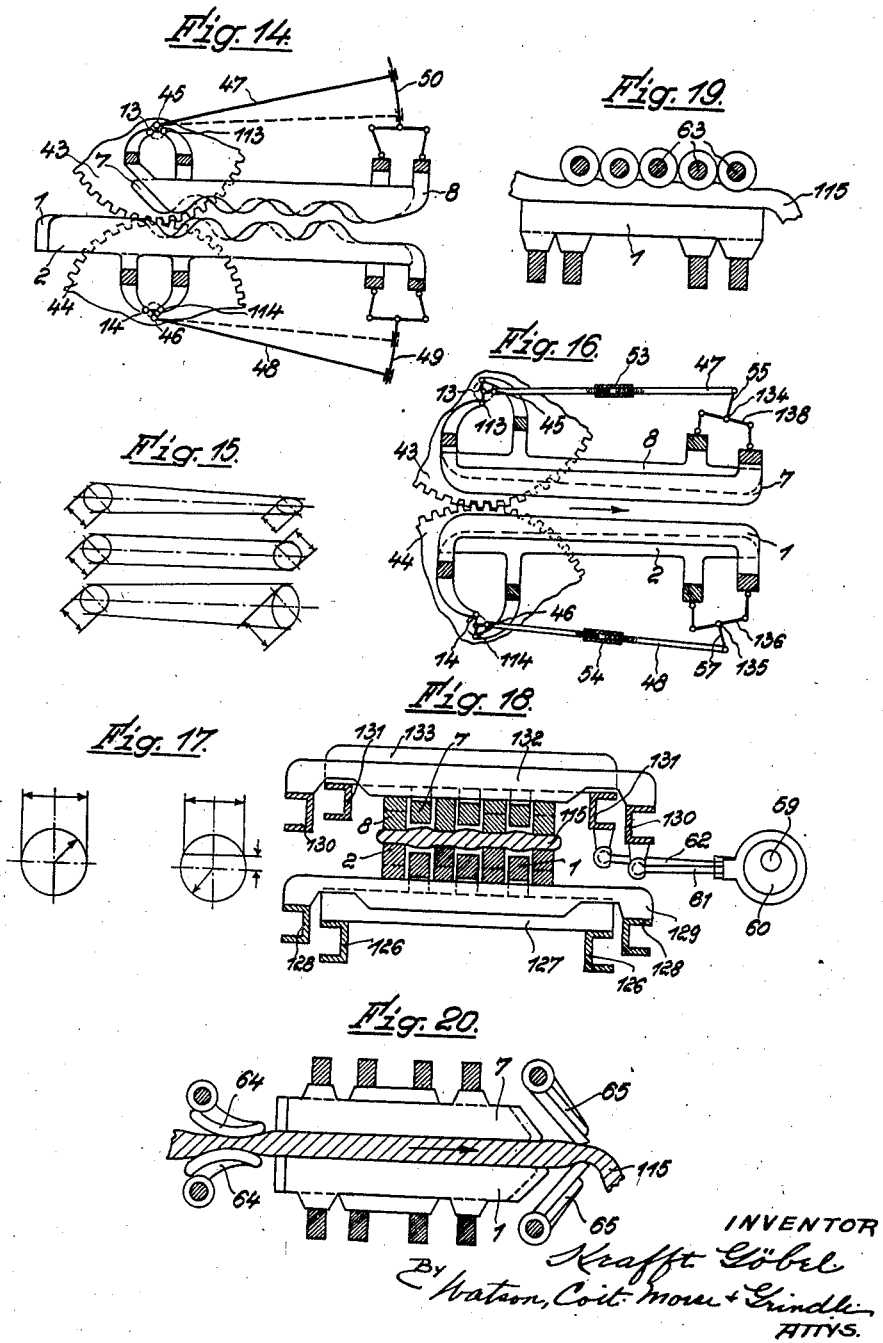

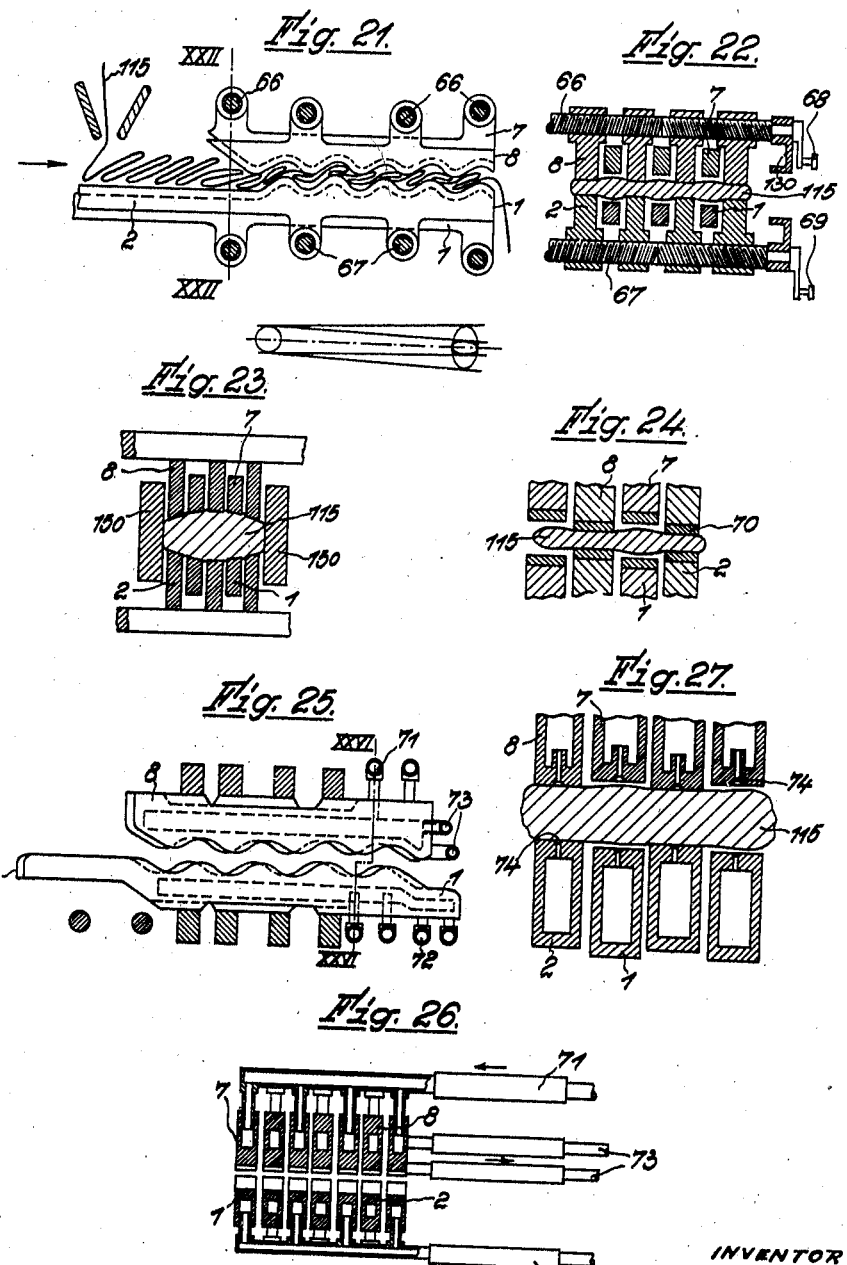

Patented Feb. 8, 1938

2,107,607

UNITED STATES PATENT OFFICE 2,107,607

MACHINE FOR TREATING RESILIENT MATERIAL

Krafft Göbel, Guben, Germany

Application April 26, 1933, Serial No. 668,135
In Germany July 15, 1932

17 Claims. (Cl. 26—25)

My invention relates to a machine for treating resilient material such as textile material, for instance, fulling, felting, pressing etc. fabrics, hat felt and the like.

It is an object of my invention to provide a machine in which the material is not only deformed by pressing, stretching, upsetting, etc., but also fed through the machine.

To this end, I equip my machine with movable bars which are arranged in pairs at opposite sides of the passage for the material to be treated, and with means for moving the bars in each pair individually for deforming, and collectively for feeding the material.

The bars may be arranged in as many groups as may be desired, and with any number of bars per group, but obviously there must not be less than two groups of bars which form the passage for the material. The individual bars in each group are staggered with respect to each other and are advanced and retracted with respect to the material by means such as crank shafts with their cranks pitched at an angle to each other. The angle may be 180 degrees so that the bars connected to the cranks move in opposite directions. The two or more groups of bars, with the means for operating their bars, are so arranged at opposite sides of the passage for the material that the individual bars of the groups constitute pairs and the bars in the pairs are alternately advanced and retracted.

It has already been proposed to provide bars for supporting, pressing and feeding in machines for treating textile materials, for instance, washing machines. In these old machines, however, only each second bar is actuated and the material can neither be fulled nor stretched because the stroke of the bars is uniform throughout.

Treating textile materials in the old machines has the further drawback that the material is treated only where it is engaged by the bars.

It has also been proposed to provide oscillating bars for feeding and conveying the material but these bars are not suitable for deforming the material as they are not arranged in pairs, as in my machine.

The bars of my machine by which the material is deformed and fed as described, engage all parts of the material so that it is subjected to thorough treatment.

Preferably, the bars, or their material-engaging faces, are not straight, or only partly straight. Thus, the bars may have a straight portion at one end, and a curved portion at the other, or their faces may be corrugated.

Other features and objects of my invention will appear from the detailed specification below, with reference to the drawings in which various types of machines embodying my invention, and details of such machines, are illustrated by way of example.

In the drawings

Fig. 1 is a view in elevation of a machine embodying the principles of my invention, the nearer side frame being removed, Fig. 2 is a section on the line II—II in Fig. 1, and Fig. 3 is a section on the line III—III in Fig. 1, of a machine having partly straight and partly curved bars which are arranged in parallel to the direction in which the material is fed through the machine;

Fig. 4 is a diagrammatic illustration of the lower portion of a machine whose general arrangement is similar to that of the machine in Figs. 1 to 3 but whose bars extend at right angles to the feeding direction, Fig. 5 shows a group whose bars are arranged in parallel relation to each other but at an angle to the feeding direction, and Fig. 6 shows a group of bars which are shaped like herringbone teeth;

Fig. 7 is an elevation, and

Fig. 8 is a section on the line VIII—VIII in Fig. 7, of a machine having bars like those of the machine in Figs. 1 to 3, but modified means for actuating the bars;

Fig. 9 is an elevation,

Fig. 10 is a section on the line X—X in Fig. 9, and

Fig. 11 is a plan view of the bars, of a machine in which one group of bars is mounted rigidly, and the other resiliently, and the bars themselves are wedge-shaped;

Fig. 12 is an elevation, and

Fig. 13 is a section on the line XIII—XIII in Fig. 12, of a machine in which the stroke imparted to the bars at one end, is variable;

Fig. 14 is a diagrammatic illustration of the machine in Figs. 12 and 13, equipped with bars having corrugated material-engaging faces, Fig. 15 shows diagrams of various strokes at one end of the bars according to Figs. 12 to 14, Fig. 16 is a diagrammatic illustration of modified means for varying the stroke of the bars at one end, Fig. 17 shows diagrams of the operation of the means according to Fig. 16, Fig. 18 is a cross section of the two groups of bars in a machine in which the upper group has a shaking appliance, Fig. 19 shows an arrangement in which one group of bars is substituted by a set of rolls, Fig. 20 shows upsetting and stretching jaws in combination with two groups of bars, Fig. 21 is a longitudinal section, and Fig. 22 is a section on the line XXII—XXII in Fig. 21, of an arrangement in which threaded spindles are provided for imparting to the individual bars in the two groups a movement at right angles to their normal movement;

Fig. 23 is a cross section of two groups in which the material-engaging edges of the bars make up together elliptical curves, Fig. 24 is a cross section of two groups in which the bars are lined with resilient material at their material-engaging faces, Fig. 25 is a longitudinal section, and Fig. 26 is a cross section on the line XXVI—XXVI in Fig. 25, of two groups of bars with means for circulating fluid in the bars, and Fig. 27 is a cross section of two groups of bars having cavities and pipes for ejecting fluid from the cavities.

The general arrangement of a machine embodying my invention will best be understood by referring to Figs. 12 and 13. The machine has a frame with two parallel uprights 42 in which is mounted the driving shaft 100, with a pulley 101, or other suitable means for imparting rotation to the shaft, at one end. The driving shaft 100 has two pairs of cranks 13 and 113 at opposite sides of the frame 42 and the cranks in each pair are pitched at 180 degrees to each other. A principal crank shaft 102 is also mounted in the frame and has two pairs of cranks 14 and 114 at opposite sides of the frame 42. The principal crank shaft 102 is operated from the driving shaft 100 by spur gears 43 and 44. The spur gears are of equal diameter so that the principal crank shaft 102 is driven at the speed of the driving shaft 100. The cranks in the pairs 14, 114 of the principal crank shaft 102 are also pitched at 180 degrees to each other, and the cranks of the driving shaft may be pitched to the cranks of the principal crank shaft at any desired angle, say 90 degrees.

Referring now to Figs. 1, 2 and 3, the driving shaft 100 is arranged vertically above the principal crank shaft 102. Their cranks 13, 113 and 14, 114, respectively, are pitched at 180 degrees to each other and at 90 degrees to the cranks of the other shaft. A sprocket 103 is mounted on the driving shaft 100 and a sprocket 104 is mounted on the principal crank shaft 102.

A chain 105 extends from the sprocket 103 on the driving shaft 100 to a sprocket 106 on the first subsidiary crank shaft 17, and a chain 107 extends from a sprocket 108 on the shaft 17 to a sprocket 109 on the second subsidiary crank shaft 18. The subsidiary crank shafts have two pairs of cranks 117 and 118, respectively. All cranks on a shaft are arranged in the same plane, and pitched at 180 degrees in the individual pairs.

Each group of bars has five bars, 1, 1 and 2, 2, 2 being the bars of the lower, and 7, 7 and 8, 8, 8 being the bars of the upper group. The bars 8, 8, 8 of the upper group are connected by a stay 9, and the bars 7, 7 are connected by a stay 10. The stay 9 is connected to the outer cranks 117 of the first subsidiary crank shaft 17 by two connecting rods 99, and the stay 10 is connected to the inner cranks 117 by two connecting rods 110. The second subsidiary crank shaft 18 has its two crank pairs 118 connected to stays 11 and 12 by exactly similar connecting rods. The cranks 13 of the driving shaft 100 are connected to the stay 10 by connecting rods 111 and the cranks 113 of the driving shaft are connected to the stay 9 by connecting rods 112.

The bars 1, 1 and 2, 2, 2 of the lower group are operated in exactly similar manner as those of the upper group from the sprocket 104 on the principal crank shaft 102, through chains, subsidiary crank shafts 15 and 16, stays 3, 4 and 5, 6 and connecting rods. The mechanism for the lower group need not be described in detail.

The material 115 moves through the machine between the bars of the upper and lower groups in the direction of the arrow in Fig. 1. The bars are straight at their inlet, and bent down at their outlet ends so that the material is deflected from horizontal to vertical.

The driving shaft 100, and the subsidiary crank shafts 17 and 18 rotate in a given direction while the principal crank shaft 102 and the subsidiary crank shafts 15 and 16 rotate in the opposite direction. The movement of the bars results from the movements imparted to them by the driving or principal crank shaft, and the four subsidiary crank shafts. The resultant movement in the present instance is the substantially elliptical curve 20, Fig. 1, whose horizontal diameter is longer than its vertical diameter, as the radius of the cranks 13, 113 and 14, 114 of the driving and principal crank shafts is larger than that of the cranks of the four subsidiary crank shafts.

As best seen in Figs. 2 and 3, the bars in the two groups are arranged in pairs and the bars in each pair are moved individually for deforming the material 115, as shown for the bars 8 and 2 in Fig. 2, while the bars 7 and 1 are at the ends of their retrieve stroke. When the bars are at the inner ends of their active or deformation stroke (bars 8 and 2) they are moved collectively to the right and feed the material 115 in the same direction while at the same time the bars 7 and 2 are moved against the feeding direction until they, in their turn, grip and feed the material.

The feeding movement is performed at a velocity which is zero at the beginning of the movement, increases to the circumferential velocity of the cranks 13 etc., and then becomes zero again. While the material 115 is between the straight or horizontal portions of the bars, its feed velocity is determined only by the cranks 13 etc., and is not influenced by the cranks 117 etc. In the curved portions, however, the influence of the cranks 117 etc. gradually preponderates until at, or about at, III—III the feed is effected exclusively by these cranks. As their radius is smaller than that of the cranks 13 etc., the feed velocity is reduced and, if the bars merge into the curved portion quite gradually, the change of velocity is gradual in proportion. By suitably selecting the ratio of the crank radii of the driving, principal and subsidiary crank shafts, any desired amount of upsetting or stretching may be imparted to the material 115.

The bars may also be arranged at right angles to the direction of feed, as shown for the lower group in Fig. 4. The bars 1 are all connected to the stays 4 and 6 by rod 116, and the bars 2 are all connected to the stays 3 and 5 by rod 119.

As shown in Fig. 5, the bars may be arranged in parallel relation to each other but at an angle to the feeding direction, or, as shown in Fig. 6, they may be arranged like the teeth of a herringbone gear. Other arrangements and forms of bars which have not been shown, obviously come within the scope of my invention.

Referring now to Figs. 7 and 8, the shafts 100 and 102, with their spur gears 43 and 44, and cranks and connecting rods, are arranged as described with reference to Figs. 1 to 3, and the bars are curved at their outlet ends, as also described. Here, however, the subsidiary crank shafts 15 etc. are dispensed with and the ends of the bars which are opposite the driving and principal crank shafts 100 and 102, are guided in straight lines. The frame 42 has four transverse guide rods 21 on which are mounted the slotted ends of rods which are connected to the individual bars. The rods 29 and 30 to which the bars 7 and 8 are connected, are straight while the bars 1 and 2 have horse-shoe rods 28 and 27, respectively. The movement imparted to the material 115 is shown at 31, where it changes from a circle at the inlet to a straight line at the outlet of the machine. The feed velocity decreases from the horizontal straight to the curved and vertical portions of the bars, and a very effective upsetting or stretching action is exerted on the material 115, the same as in Figs. 1 to 3.

Means may be provided for varying the relative distance of the subsidiary crank shafts 15, 16, 17 and 18. For instance, the upper shafts 17 and 18 may be mounted for vertical displacement so as to move with the raising and lowering of the lower bars, and preferably the upper shafts are displaced against the action of resilient means.

An example for a machine with movable upper subsidiary shafts 17 and 18 is illustrated in Figs. 9 and 10. In this machine, the subsidiary crank shaft 16 is the driving shaft and the pulley 100, shown as a fast and loose pulley in Fig. 10, is keyed on this shaft. The sprocket 103 is also keyed on this shaft, and, through intermediate sprockets and chains which will not be described in detail, drives the shafts 15, 17 and 18. The two lower shafts 15 and 16 are mounted to rotate in the uprights 42 of the frame but the two upper shafts are mounted on rocking levers 120 and 122 which are fulcrumed on the frame at 121 and 123, respectively. The levers are held down at their free ends by bolts 34 and 35, with springs 40 and 41, which bolts are anchored in the frame at 124 and 125, respectively, with their lower ends. The pressure of the springs is regulated by thumb nuts or the like. The bars are straight with rounded ends, and are connected to the cranks of the respective subsidiary shafts by rods, as shown at 38, 39 for the cranks 117, and at 36, 37 for the cranks 118. A similar arrangement is provided for the bars of the lower group.

In order to avoid markings on the material, the bars are wedge-shaped, as shown for the bars 1, 2 of the lower group in Fig. 11. The pressing of goods by such bars is quite uniform. The bars may also be arranged in the manner of rays, for the same purpose. It is understood that bars of this kind are not limited to the machine illustrated in Figs. 9 and 10.

Referring now to Figs. 12 and 13, the general arrangement of this machine has already been described. The machine is equipped with means for varying the movement imparted to the bars 1, 2 and 7, 8 at the outlet end of the machine. The bars are mounted on rocking frames which at the inlet end of the machine are supported on the cranks 13, 113 and 14, 114 of the shafts 100 and 102 while at the outlet end they are engaged by movement-varying means. The bars 1, of the lower group, are mounted on a frame having side bars 126 which are supported on the cranks 13 of the driving shaft 100, and transverse bars 127 to which the bars 1, 1 are connected. The bars 2 are connected to side bars 128 on the cranks 113, and to transverse bars 129. In a similar manner, the bars 7 and 8 of the upper group are mounted on side bars 130, 131, with transverse bars 132, 133, respectively.

An eccentric 45 is mounted on the driving shaft 100 and its rod 47 is connected to a curved link 50 on a shaft 134. Holes 52 are provided in the link 50 for connecting the end of the rod 47 at various points of the link. An eccentric 46 is mounted on the principal crank shaft 102 and its rod 48 is connected to a curved link 49 on a shaft 135, with holes 51. The shaft 135 supports the side bars 126 and 128 of the lower group of bars by a double-armed lever 136 and links 137, 138. Similarly, the frames 130 and 131 of the upper group are supported from the shaft 134 by a double-armed lever 138' and links 139, 140.

A resilient connection, as and for the purpose specified with reference to Figs. 9 and 10, may be provided by mounting the shaft 134 for the upper group at the free end of a double-armed lever 142 which is pivoted in the frame at 141, its other end being supported by a spring 40 and rod 34.

The material-engaging faces of the bars may be corrugated as shown for the machine just described in Fig. 14, but it is understood that bars having corrugated, or otherwise irregular faces, are not limited to this machine. Corrugations or the like increase the efficiency of the action, such as fulling, which the bars exert on the material.

By varying the position of the eccentric rods 47 and 48 on the curved links 50 and 49, respectively, the effective length of the links, and consequently the stroke of the bars 1, 2 and 7, 8 at the outlet of the machine, is varied, as will be understood from the diagrams in Fig. 15. The ratio of the feed movements at the inlet and outlet ends is also varied so that the feed may be uniform, or the material may be upset or stretched, as desired.

Referring to Fig. 16, the eccentric rods 47 and 48 are connected to arms 55 and 57, respectively, on the shafts 135 and 134, respectively, and divided. The parts of the eccentric rods have threads of opposite hands on their inner ends, with threaded sleeves 53 and 54 placed on them. Any desired amount of upsetting or stretching may be obtained in this manner, with flat or corrugated bars, without damaging the material. It will be understood that not only the feeding stroke of the bars at their ends but also the stroke of the upper bars, related to that of the lower bars, and vice versa, can be varied. Diagrams Fig. 17 illustrate this.

Means may be provided for shaking the bars, and a shaking appliance for the bars of the upper group is shown in Fig. 18, it being understood that the bars of the lower group, or the bars of both groups, might as well be shaken. On a shaft 59, two eccentrics or cams are keyed. Only one of them is shown at 60, with its rod 61 connected to the side bars 130 of the bars 8. The rod of the other eccentric is connected to the side bars 131 of the bars 7. By these means, the upper group is displaced laterally with respect to the lower group, and the bars of the upper group may also be displaced with respect to each other if the two eccentrics or cams on the shaft 59 are pitched at an angle to each other. The working of the material obviously becomes more effective with the shaking appliance, in particular, if the lower group is moved in opposite direction to the upper group.

As shown in Fig. 19, rolls 63 may be provided instead of one group of bars. In the present instance, the bars 7, 8 of the upper group are replaced by the rolls. The rolls may be idle and only be pressed to the material 115, or they may be braked, and thus the material is upset.

Jaws for upsetting and stretching the material may be provided as shown in Fig. 20. 64 are stretching, and 65 are upsetting jaws which may be applied to the material 115 by gravity or by spring pressure. Only the stretching, or only the upsetting jaws may be provided, as desired.

Lateral upsetting or stretching of the material may be effected by the arrangement illustrated in Figs. 21 and 22, where threaded spindles of opposite hands are mounted to rotate in the side bars 128 and 138 of the upper and lower groups of bars. 66 is the spindle for the upper, and 67 is the spindle for the lower group. Cranks 68 and 69 are secured on the outer ends of the spindles for rotating them and the cranks may be operated by any suitable means, not shown. By rotating the cranks and spindles, the bars of the groups are moved nearer together or further apart, so that the material 115 is upset and/or stretched in its transverse direction.

The material-engaging faces of the bars may be curved as shown in Fig. 23, and the length of the bars may be so determined that their faces define a curve together, for instance, an ellipse. 150, 150 are side plates for preventing extrusion of the material at the sides of the bars.

Resilient liners of rubber or the like may be placed on the faces of the bars, as shown at 70 in Fig. 24.

In order to heat or cool the bars, or some of them, I may provide the system illustrated in Figs. 25 and 26. The bars to be heated or cooled are hollow, and may be corrugated as shown, or flat. 71, 72 are the inlet, and 73 are the outlet pipes for the medium, steam, hot water, or the like.

As shown in Fig. 27, the bars may be hollow and equipped with discharge nozzles 74 for discharging steam, hot water or the like, on the material 115.

As mentioned, my invention may be modified in various ways without departing from its gist. Thus, the bars 1, 2 and 7, 8 may be arranged like rays with respect to each other, or their material-engaging faces may be wedge-shaped, with grooves between the wedges extending at an angle to the feeding direction.

If means are provided for varying the level of one group with respect to the other group, as shown in Figs. 9 and 10, the stroke of the bars may be equal throughout their length. In this case, the material is only pressed and the pressure is determined by the relative position of the groups and by the interposed resilient means (springs 40, 41).

Other means than cranks and connecting rods, for instance, levers, not shown, may be provided for operating the bars. More than two groups, at more or less than four bars per group, may be provided, with a corresponding number of cranks or other operating means.

If desired, the bars of all, or any, of the groups may be arranged in a vat which is filled with hot water or some other liquid, so that the material is worked in the liquid. Such a vat may be provided between the two uprights 42 in Fig. 13.

I claim:

1. In a machine for treating resilient material, movable bars arranged in pairs at opposite sides of the passage for the material to be treated and at an oblique angle to the direction in which the material moves through the passage, and means for moving the bars in each pair individually for deforming, and collectively for feeding the material.

2. In a machine for treating resilient material, movable bars having a straight and a curved portion and arranged in pairs at opposite sides of the passage for the material to be treated, and means for moving the bars in each pair individually for deforming, and collectively for feeding the material.

3. In a machine for treating resilient material, movable bars having a portion extending in parallel to the direction in which the material to be treated moves through the machine, a portion extending at right angles to the parallel portion, and a curved intermediate portion, said bars being arranged at opposite sides of the passage for the material to be treated, and means for moving the bars in each pair individually for deforming, and collectively for feeding the material.

4. In a machine for treating resilient material, wedge-shaped movable bars arranged in pairs at opposite sides of the passage for the material to be treated, and means for moving the bars in each pair individually for deforming, and collectively for feeding the material.

5. In a machine for treating resilient material, hollow movable bars arranged in pairs at opposite sides of the passage for the material to be treated, means for establishing a flow of fluid in said bars, and means for moving the bars in each pair individually for deforming, and collectively for feeding the material.

6. In a machine for treating resilient material, hollow movable bars with openings for ejecting fluid from the bars toward the material to be treated, said bars being arranged in pairs at opposite sides of the passage for the material to be treated, and means for moving the bars in each pair individually for deforming, and collectively for feeding the material.

7. In a machine for treating resilient material, movable bars arranged in two groups at opposite sides of the passage for the material to be treated, the individual bars in each group being arranged in staggered relation to each other and opposite the bars of the other group so as to form pairs at opposite sides of the passage, and means for moving the bars in each pair individually for deforming, and collectively for feeding the material, said means including a drive shaft, crank and lever transmission elements operatively connected with said drive shaft, and means positively connecting said bars with said intermeshing elements, the radii of said cranks being so related to each other that the amount of individual movement imparted to said bars is different from the amount of collective movement.

8. In a machine for treating resilient material, movable bars arranged in pairs at opposite sides of the passage for the material to be treated, and means for moving the bars in each pair individually for deforming, and means for moving said bars collectively for feeding the material, said means being adapted to impart movements of different characters to opposite ends of said bars.

9. In a machine for treating resilient material, movable bars arranged in pairs at opposite sides of the passage for the material to be treated, means for moving the bars in each pair individually for deforming, and means for moving said bars collectively for feeding the material, said means being adapted to impart movements of different characters to opposite ends of said bars, and means for varying the amount of movement imparted to certain of said bars.

10. In a machine for treating resilient material, movable bars arranged in pairs at opposite sides of the passage for the material to be treated, means for moving the bars in each pair individually for deforming, and means for moving said bars collectively for feeding the material, said means being adapted to impart movements of different characters to opposite ends of said bars, and mechanism including a rocking link operatively connected to the bars, and means for driving said link, said last-mentioned means being adapted to engage said link at various points so as to vary its effective length.

11. In a machine for treating resilient material, movable bars arranged in pairs at opposite sides of the passage for the material to be treated, and means for moving the bars in each pair individually for deforming, and collectively for feeding the material, and in a curve at one end and stationary guide pins at the other end of the bars.

12. In a machine for treating resilient material, movable bars arranged in pairs and in groups at opposite sides of the passage for the material to be treated, and means for moving one of said groups laterally.

13. In a machine for treating resilient material, spaced movable bars arranged in pairs at opposite sides of the passage for the material to be treated, means for varying the spacing of the bars during operation, and means for moving the bars in each pair individually for deforming, and collectively for feeding the material.

14. In a machine for treating resilient material, movable bars arranged in pairs at opposite sides of the passage for the material to be treated, means for moving the bars in each pair individually for deforming, and collectively for feeding the material, and means outside the machine for exerting a force on the material in its longitudinal direction apart from said collective movement.

15. In a machine of the class described, in combination, a plurality of spaced pairs of deforming bars for fulling, felting, beating and stretching a mass of fiber, means for swinging the bars of each pair toward each other so as to deform said mass of fiber which is interposed between said bars, and means for swinging all of said pairs collectively so as to move said mass of fiber through the machine, both of said means being positively connected with said bars, whereby lost motion or backlash may be eliminated and sufficient pressure brought to bear upon the material being treated to accomplish the said purposes.

16. In a machine of the class described, in combination, a plurality of spaced pairs of parallel deforming bars for fulling, felting, beating and stretching a mass of fiber, one bar of each of said pairs being arranged upon one side of a passage through the machine and the other bars of said pairs disposed upon the opposite side of said passage, means for swinging said oppositely disposed bars toward each other to deform said mass of fiber, and means for imparting another movement to said bars whereby the mass of fiber is fed through the machine at the same time that it is treated, both of said means being positively connected with said bars, whereby lost motion or backlash may be eliminated and sufficient pressure brought to bear upon the material being treated to accomplish the said purposes, the minimum space between the oppositely disposed bars being less than the thickness of the mass of material being treated.

17. In a machine for treating resilient material, in combination, a plurality of spaced pairs of parallel deforming bars for fulling, felting, beating and stretching a mass of fiber, one bar of each of said pairs being arranged upon one side of a passage through the machine and the other bars of said pairs disposed upon the opposite side of said passage, driving means positively connected with each of said oppositely disposed bars for rotating at least the greater portion thereof in a closed orbit so that oppositely disposed bars of each pair are swung toward each other in order to deform said mass of fiber, said rotary motion also having a component longitudinally of said passage whereby the mass of fiber is fed through the machine at the same time that it is treated, and means whereby alternate pairs of cooperating bars are brought into engagement with the mass of fiber in alternation.

KRAFFT GÖBEL.